United States Patent [19]

Neubauer et al.

[11] 4,138,472

[45] Feb. 6, 1979

[54] PROCESS FOR OBTAINING COARSELY CRYSTALLINE PURE AMMONIUM SULFATE

[75] Inventors: Gerald Neubauer, Kapellen; Gerard Van Wauwe, Edegem; Josef Beullens, Kalmthout, all of Belgium; Uwe Brand, Lampertheim, Fed. Rep. of Germany; Hugo Fuchs, Ludwigshafen, Fed. Rep. of Germany; Klaus Kartte, Beindersheim, Fed. Rep. of Germany

[73] Assignee: BASF Aktiengesellschaft, Ludwigshafen, Fed. Rep. of Germany

[21] Appl. No.: 844,647

[22] Filed: Oct. 25, 1977

[51] Int. Cl.² ............................................. C01C 1/242
[52] U.S. Cl. ............................. 423/549; 260/239.3 A
[58] Field of Search .................. 260/239.3 A; 423/549

[56] References Cited

U.S. PATENT DOCUMENTS 3,907,781  9/1975  De Rooij et al. ............. 260/239.3 A
3,937,789  2/1976  Donati et al. ........................ 423/549

FOREIGN PATENT DOCUMENTS 1194863  6/1965  Fed. Rep. of Germany ... 260/239.3 A

Primary Examiner—O. R. Vertiz
Assistant Examiner—Wayne A. Langel
Attorney, Agent, or Firm—Keil & Witherspoon

[57] ABSTRACT

A process for obtaining coarsely crystalline pure ammonium sulfate from reaction mixtures which have been obtained by Beckmann rearrangement of cyclohexanone-oxime with sulfuric acid or oleum, by neutralizing the mixtures with ammonia at an elevated temperature, with the addition of recycled ammonium sulfate mother liquor, the concentration being so chosen that during the neutralization no solid ammonium sulfate precipitates, separating the crude caprolactam from the ammonium sulfate solution, crystallizing ammonium sulfate by evaporating the ammonium sulfate solution under reduced pressure, separating off the crystallized ammonium sulfate and recycling the mother liquor to the neutralization stage. The neutralization is carried out at from 80° to 115° C. under autogenous pressure and the ammonium sulfate solution obtained after separating off the crude lactam is evaporated under a pressure of from 200 to 600 mm Hg while cooling to from 72° to 101° C.

5 Claims, No Drawings

PROCESS FOR OBTAINING COARSELY CRYSTALLINE PURE AMMONIUM SULFATE

The present invention relates to a process for obtaining coarsely crystalline pure ammonium sulfate from reaction mixtures which have been obtained by Beckmann rearrangement of cyclohexanone-oxime with sulfuric acid or oleum, by neutralizing the mixtures with ammonia at an elevated temperature with addition of recycled ammonium sulfate mother liquor, the concentration being so chosen that no solid ammonium sulfate precipitates during the neutralization, separating the crude lactam from the ammonium sulfate solution, crystallizing ammonium sulfate by evaporating the ammonium sulfate solution under reduced pressure, separating off the crystallized ammonium sulfate and recycling the mother liquor to the neutralization stage.

German Pat. No. 1,194,863 discloses a process in which reaction mixtures which have been obtained by Beckmann rearrangement of cyclohexanone-oxime with sulfuric acid or oleum are neutralized with ammonia at from 30° to 70° C. and the ammonium sulfate solution is separated off, and evaporated under reduced pressure whilst cooling to 30° C., whereupon ammonium sulfate crystallizes out. The particle size of the ammonium sulfate thus produced does not conform to industrial requirements. Furthermore, the ammonium sulfate obtained still contains residual moisture in excess of the desired value. Finally, the ammonium sulfate thus obtained still contains about 0.5 percent by weight of caprolactam, which is undesirable inasmuch as it reduces the yield of caprolactam. It is true that German Laid-Open Application DOS No. 2,534,075 discloses a process in which reaction mixtures from the Beckmann rearrangement are neutralized at 150° C. under pressures of from 2 to 5 bars, the crude lactam is separated off and solid ammonium sulfate is then caused to separate out in a combined second neutralization and crystallization stage, whilst producing steam. In view of the fact that caprolactam is present together with solid ammonium sulfate in the crystallization stage of this process, such a process appears unsuitable for reducing the caprolactam content in the ammonium sulfate.

We have found that coarsely crystalline pure ammonium sulfate is obtained more advantageously than hitherto from reaction mixtures which have been obtained by Beckmann rearrangement of cyclohexanone-oxime with sulfuric acid or oleum, by neutralizing the mixtures with ammonia at an elevated temperature with addition of recycled ammonium sulfate mother liquor, the concentration being so chosen that during the neutralization no solid ammonium sulfate precipitates, separating the crude lactam from the ammonium sulfate solution, crystallizing ammonium sulfate by evaporating the ammonium sulfate solution under reduced pressure, separating off the crystals and recycling the mother liquor to the neutralization stage, if the neutralization is carried out at from 80° to 115° C. under autogenous pressure and the resulting ammonium sulfate solution is evaporated under a pressure of from 200 to 600 mm Hg whilst cooling to from 72° to 101° C.

The new process has the advantage that the ammonium sulfate is obtained in coarser crystals than hitherto. In addition, the ammonium sulfate produced contains less residual moisture, which facilitates further processing. It is an essential advantage that the ammonium sulfate thus produced contains less caprolactam, thereby increasing the yield of valuable products. Finally, the vapors formed during crystallization are in a form which enables them to be used in such a way as to utilize the energy which they contain.

The process starts from reaction mixtures which have been obtained by Beckmann rearrangement of cyclohexanone-oxime with sulfuric acid or oleum. Typical mixtures contain from 40 to 50% by weight of caprolactam and from 50 to 60% by weight of sulfuric acid. They are neutralized with gaseous ammonia or ammonia in aqueous solution, together with ammonium sulfate mother liquor obtained from the crystallization. The ammonia and ammonium sulfate solution can be combined before reaching the neutralization zone or directly in the neutralization zone. The neutralization is carried out with intensive mixing, eg. in a mixing tube. Other mixing equipment, eg. a stirred vessel with a turbo-mixer, may also be used. Advantageously, the pH in the neutralization zone is maintained at from 3 to 6, especially from 4.5 to 5.0.

It is an essential characteristic of the invention that the neutralization is carried out at from 80° to 115° C. The pressure corresponds to the autogenous pressure at the particular neutralization temperature and for the particular composition of the reaction mixture.

It is necessary to ensure that no solid ammonium sulfate precipitates during the neutralization. For this reason, the concentration of the ammonium sulfate mother liquor used is at most so high that after neutralization an almost saturated solution is obtained. If a temperature rise of from 10° to 40° C. is envisaged during neutralization, the amount of mother liquor used is from about 5 to 50 times the amount of the mixture from the rearrangement reaction. This corresponds to a ratio of mother liquor to water of dilution of from about 5:1 to 65:1.

The neutralization mixture is then passed into a separating zone where the two liquid phases, ie. the crude lactam and the aqueous ammonium sulfate solution, are separated. This separation may be effected, for example, after the mixture has formed two layers, by simple draining-off or by the use of separators. Obviously, the autogenous pressure is maintained during the process.

The light phase contains the aqueous crude lactam and is advantageously cooled to avoid the formation of by-products. This phase is extracted with benzene to effect a separation from ammonium sulfate solution and impurities which it contains, and the extract is then worked up by distillation. A method of working up the crude lactam is disclosed in, for example, German Pat. No. 1,194,863.

The ammonium sulfate solution obtained in the separating zone is fed to an evaporator/crystallizer, advantageously without cooling the solution. Water is evaporated under a pressure of from 200 to 600 mm Hg until the ammonium sulfate solution is at from 72° to 101° C. Ammonium sulfate crystallizes out due to supersaturation. Obviously, the solution is not evaporated completely but only to the point that as much ammonium sulfate crystallizes out as is formed during the neutralization. The amount of water to be evaporated is also chosen accordingly. The salt slurry obtained is fed to a separating device, eg. a filter or a centrifuge. The mother liquor obtained is recycled to the neutralization stage. However, it is also possible first to produce an enrichment in solids, eg. by sedimentation, and to pass only the solid-rich material through the filter or the centrifuge, and combine the clear solution, obtained during the enrichment process, with the filtrate. Obviously, the amount of water added to the filtrate corresponds to the amount of water evaporated. Advantageously, the condensate of the vapors from the evaporator or crystallizer is used for this purpose. It is also possible to replace the amount of water separated off with the lactam. In every case, the amount of water must be sufficient that no ammonium sulfate precipitates during neutralization. If aqueous ammonia solution is used for the neutralization, it may be unnecessary to add water.

The minimum amount of water used for dilution varies, because of the temperature-dependent solubility of the ammonium sulfate, with the temperature reached during neutralization and with the desired final concentration of the ammonium sulfate solution. In general, from 1 to 1.5 parts of water of dilution suffice per part of ammonium sulfate to be expected. If aqueous ammonia solution is used for neutralization, it can be mixed with the ammonium sulfate mother liquor upstream from the neutralization zone, but alternatively the ammonium sulfate solution is recycled undiluted and the aqueous ammonia is introduced directly into the neutralization zone.

The vapors at about 100° C. which are formed in the crystallizer/evaporator are advantageously used for concentrating aqueous hydroxylammonium sulfate solution intended to be employed for the oximation of cyclohexanone. For example, hydroxylammonium sulfate solutions containing from 115 to 120 g of hydroxylamine/l are concentrated to from 140 to 250 g of hydroxylamine/l at from 50° to 60° C. and pressures of from 70 to 120 mm Hg.

The vapors formed can also be used for evaporating ammonium sulfate solutions formed during the manufacture of cyclohexanone-oxime by reacting cyclohexanone and hydroxylammonium sulfate whilst neutralizing with ammonia.

The ammonium sulfate obtained by the process of the invention is used as an inorganic fertilizer.

The Examples which follow illustrate the process of the invention. In the Examples, parts are by weight and bear the same relation to parts by volume as that of the kilogram to the liter.

EXAMPLE 1

6.2 Parts of a mixture, containing sulfuric acid, from the rearrangement of cyclohexanone-oxime (with a composition of 42.7% by weight of caprolactam and 57.3% by weight of sulfuric acid) and 1,610 parts by volume of ammonia gas are separately added, per hour, to a circulation system of 200 parts/hour of a 49.5% strength by weight ammonium sulfate solution at 90° C. The neutralization mixture formed has a pH of 4.5; during the neutralization, the temperature rises to 100° C. The autogenous pressure is 1 bar. The neutralization mixture is passed into a separating vessel in which 3.86 parts of aqueous crude caprolactam containing about 68% by weight of caprolactam, as the light phase, and 209.25 parts of concentrated ammonium sulfate solution, as the heavy phase, are separated from one another per hour. The concentrated ammonium sulfate solution is fed into a crystallizer/evaporator and 4.8 parts of water per hour are evaporated under a pressure of 540 mm Hg. At the same time, the solution cools to 90° C., resulting in supersaturation and crystallization. Per hour, 4.7 parts of pure white ammonium sulfate with a particle size distribution of d' 1.2 are obtained from the resulting salt slurry in a centrifuge. The ammonium sulfate contains 0.15% by weight of caprolactam. The centrifuged material obtained also contains 0.5% by weight of water. The resulting mother liquor, 200 parts per hour, is diluted with 4.8 parts of water and fed to the neutralization stage.

COMPARATIVE EXAMPLE

The procedure described in the above Example is followed except that the neutralization is carried out at 50° C. and the solution obtained is evaporated, after removing the caprolactam, under a pressure of 40 mm Hg until the temperature reaches 40° C. After centrifuging, ammonium sulfate containing 1.2% by weight of water and 0.49% by weight of caprolactam, based on anhydrous ammonium sulfate, is obtained. The ammonium sulfate obtained furthermore has a particle size distribution of d' ~ 1.0.

We claim:

1. In a process for obtaining coarsely crystalline pure ammonium sulfate from reaction mixtures containing caprolactam which have been obtained by Beckmann rearrangement of cyclohexanone-oxime with sulfuric acid or oleum, by neutralizing the mixtures with ammonia at an elevated temperature, with the addition of recycled ammonium sulfate mother liquor, the concentration being so chosen that during the neutralization no solid ammonium sulfate precipitates, separating the crude caprolactam from the ammonium sulfate solution, crystallizing ammonium sulfate by evaporating the ammonium sulfate solution under reduced pressure, separating off the crystallized ammonium sulfate and recycling the mother liquor to the neutralization stage, the improvement comprising: carrying out the neutralization at from 80° to 115° C. under autogenous pressure and evaporating the ammonium sulfate solution obtained after separating off the crude caprolactam under a pressure of from 200 to 600 mm Hg whilst cooling to from 72° to 101° C.

2. A process as set forth in claim 1, in which a pH of from 4.5 to 5.0 is maintained during neutralization.

3. A process as set forth in claim 1, in which the condensate of the vapors obtained during evaporation is used to dilute the ammonium sulfate mother liquor.

4. A process as set forth in claim 1, in which the vapors obtained during evaporation are used to concentrate the hydroxylammonium sulfate solution used for the oximation.

5. A process as set forth in claim 1, in which the vapors obtained during evaporation are used to concentrate ammonium sulfate solutions which have been obtained by reaction of cyclohexanone with hydroxylammonium sulfate in the presence of ammonia.

* * * * *

UNITED STATES PATENT AND TRADEMARK OFFICE
CERTIFICATE OF CORRECTION

PATENT NO. : 4,138,472
DATED : February 6, 1979
INVENTOR(S) : Gerald Neubauer et al It is certified that error appears in the above-identified patent and that said Letters Patent are hereby corrected as shown below:

In the Heading after Section "[22] Filed: Oct. 25,1977, insert the following section:

-- [30] Foreign Application Priority Data

November 10,1976 Fed. Rep. of Germany... 2651195 --

Signed and Sealed this

Tenth Day of July 1979

[SEAL]

Attest:

LUTRELLE F. PARKER

Attesting Officer    Acting Commissioner of Patents and Trademarks